(12) United States Patent
Yokota (10) Patent No.: US 7,740,213 B2
(45) Date of Patent: Jun. 22, 2010

(54) LIQUID CRYSTAL PANEL STAND AND TILT DEVICE

(76) Inventor: Katsuyuki Yokota, c/o Funai Electric Co., Ltd., 7-1, 7 chome Nakagaito, Daito-shi, Osaka (JP) 574-0013

( * ) Notice: Subject to any disclaimer, the term of this patent is extended or adjusted under 35 U.S.C. 154(b) by 368 days.

(21) Appl. No.: 11/788,943

(22) Filed: Apr. 23, 2007

(65) Prior Publication Data

US 2007/0284496 A1 Dec. 13, 2007

(30) Foreign Application Priority Data

Apr. 27, 2006 (JP) .............................. 2006-123802

(51) Int. Cl.
- A47F 5/00 (2006.01)
- A47F 7/00 (2006.01)
- F16M 11/00 (2006.01)
- F16M 13/00 (2006.01)
- A47G 29/00 (2006.01)
- G06F 1/16 (2006.01)

(52) U.S. Cl. .................... 248/125.7; 248/150; 248/371; 361/679.02; 361/681

(58) Field of Classification Search .............. 248/128.5, 248/125.7, 150, 371, 923, 122.1, 922, 146, 248/917, 919, 158, 291.1, 920, 133; 345/520; 361/679.02, 681; 16/235, 239
See application file for complete search history.

(56) References Cited

U.S. PATENT DOCUMENTS

| | | | |
|---|---|---|---|
| 4,808,017 A | | 2/1989 | Sherman |
| 6,231,021 B1 * | | 5/2001 | Hong .......................... 248/371 |
| 6,357,712 B1 * | | 3/2002 | Lu ........................... 248/291.1 |
| 6,883,206 B2 * | | 4/2005 | Yang et al. ..................... 16/337 |
| 7,516,925 B2 * | | 4/2009 | Sawai et al. .................. 248/146 |
| 2003/0122046 A1 * | | 7/2003 | Huong ..................... 248/291.1 |
| 2007/0050942 A1 * | | 3/2007 | Hu .............................. 16/340 |

FOREIGN PATENT DOCUMENTS

EP 0574125 A 12/1993

(Continued)

OTHER PUBLICATIONS

Japanese Notice of the reason for refusal, dated Apr. 16, 2008.

(Continued)

*Primary Examiner*—J. Allen Shriver, II
*Assistant Examiner*—Christopher Garft (57) ABSTRACT

In the liquid crystal panel stand, the rotating shaft (13) pierces the fixed member (12), and a fixing portion is provided for fixing the rotating shaft to block its rotation around the axial center. The holding member (14) having a protrusion (14b) protruding from one side surface is formed into a thin configuration for applying the urging force in the direction where the protrusion (14b) protrudes so as to be fixed to the fixed member (12) to apply the pressing force in the direction where the protrusion (14b) protrudes with the force in substantially parallel with the rotating shaft (13). The movable member (11) includes a plurality of holding holes (15, 16) as openings through which the protrusion (14b) of the holding member (14) fixed to the fixed member (12) is inserted to be engaged therewith when the movable member (11) is rotated along the rotating shaft (13).

1 Claim, 8 Drawing Sheets

FOREIGN PATENT DOCUMENTS

| | | |
|---|---|---|
| JP | 2000-055031 A | 2/2000 |
| JP | 2001-165143 | 6/2001 |
| JP | 2002-266841 A | 9/2002 |
| JP | 2004-327661 A | 11/2004 |
| JP | 3106739 U | 11/2004 |
| JP | 2005-188542 | 7/2005 |
| JP | 2005-189514 A | 7/2005 |
| JP | 2005-242075 | 9/2005 |
| JP | 2005-308069 A | 11/2005 |

OTHER PUBLICATIONS

The extended European search report dated Nov. 13, 2009.

* cited by examiner

PRIOR ART

LIQUID CRYSTAL PANEL STAND AND TILT DEVICE

CROSS-REFERENCE TO RELATED APPLICATIONS

The present application is related to Japanese Patent Application No. 2006-123802, filed Apr. 27, 2006, the entire disclose of which is expressly incorporated by reference herein.

BACKGROUND OF THE INVENTION (1). Field of the Invention

The present invention relates to a tilt device, and more particularly to a tilt device for holding a rotating position of a movable member which fixes a flat panel, and a liquid crystal panel stand using the tilt device.

(2). Description of the Related Art

Figure 8:
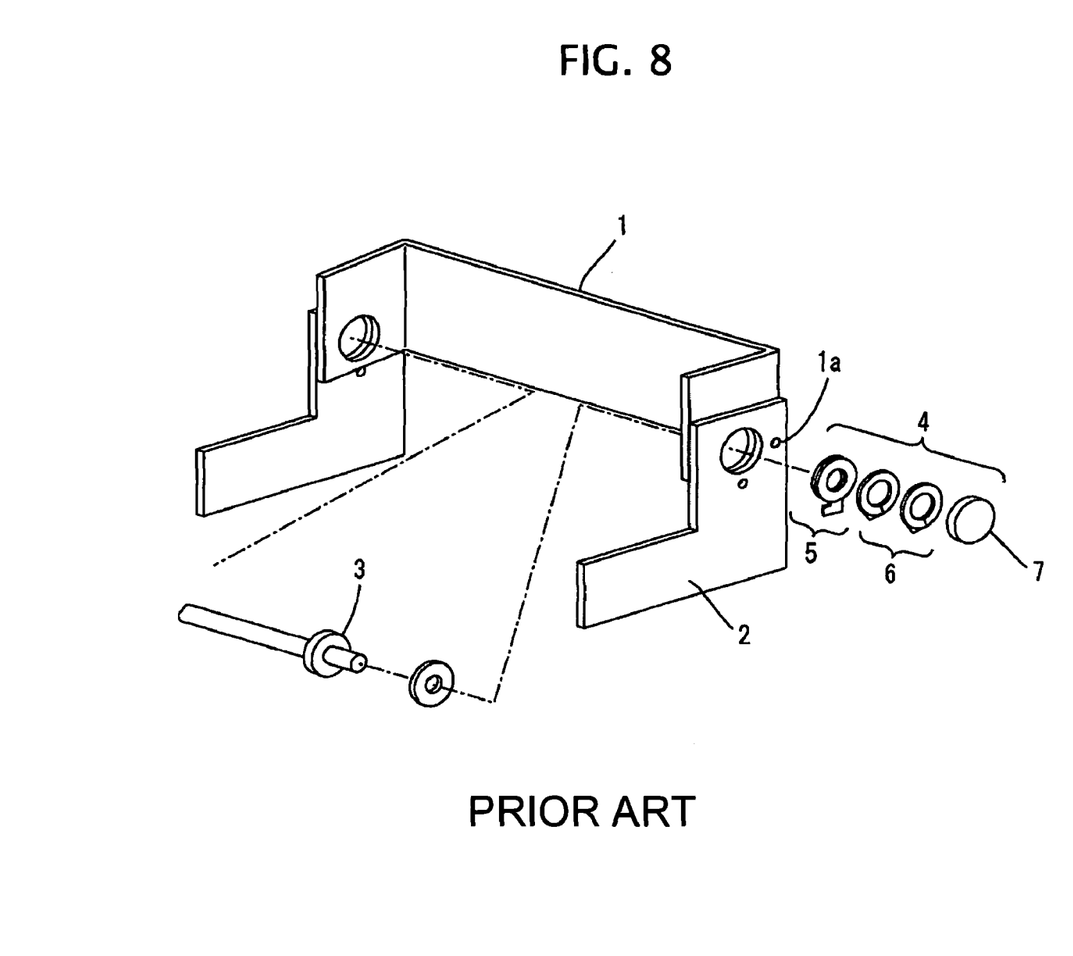
FIG. 8 is a view of the related art tilt device.

FIG. 8 is a view schematically showing a structure of a generally employed tilt device. Referring to the drawing, the tilt device includes movable members 2 which fix a flat panel, for example, a liquid crystal panel, a fixed member 1 which holds the movable members, a rotating shaft 3 which rotatably connects the movable members and the fixed member, and a holding mechanism 4 which holds a rotating position of the movable member 2 rotated by the rotating shaft 3.

The holding mechanism 4 serves to hold the rotating position of the movable member 2 as described above, and includes a lock mechanism 5 which defines the rotating position, and a torque generating portion formed of a spring member 6 which uses a plate spring that applies the urging force, and a retaining portion 7 which retains the spring member 6. The movable member 2 has an engagement hole 1a engaged with the fixed member in accordance with a rotating angle required by the movable member. The fixed member 1 to which the urging force of the spring member 6 is applied is brought into engagement with the engagement hole 1a. The aforementioned structure allows the position of the liquid crystal panel fixed by the movable members 2 to be held at the predetermined rotating angle.

Japanese Unexamined Patent Application Publication No. 2005-242075 discloses the mechanism in which the fixed member is provided with the above-described holding mechanism, and the coil spring is used as the spring member.

Japanese Unexamined Patent Application Publication No. 2005-188542 discloses the mechanism in which the multi-layered fixed member is engaged with the engagement hole formed in the movable member, and each of those layers of the fixed member with the same configuration is engaged with one another such that the angle is easily adjusted.

Japanese Unexamined Patent Application Publication No. 2001-165143 discloses the method of holding the rotating position of the movable member using the friction torque of the friction pin, which is different from those described above.

The mechanism disclosed in Japanese Unexamined Patent Application No. 2005-242075 has the disadvantage of the elongated production time because the holding mechanism is formed of the lock mechanism and the torque generation mechanism which have been separately produced.

The mechanism disclosed in Japanese Unexamined Patent Application No. 2005-188542 has the disadvantage of low production efficiency as the holding mechanism includes the lock mechanism and the torque generation mechanism which have been separately produced, and a plurality of plate springs have to be stacked to form the spring member.

The mechanism disclosed in Japanese Unexamined Patent Application No. 2001-165143 has the disadvantage that the number of the parts has never been considered because it is intended to reduce the hinge size of the tilt device, and further has the disadvantage of an additional labor to handle the fluid such as grease for generating the friction torque of the tilt hinge.

BRIEF SUMMARY OF THE INVENTION

The present invention discloses a tilt device in which the holding mechanism includes an integrated component of the lock mechanism and the torque generation mechanism so as to be easily assembled, and a liquid crystal panel using the tilt device.

According to the present invention, a liquid crystal panel stand, comprising:

a movable member that fixes a liquid crystal panel; a fixed member that supports the movable member; a rotating shaft that pierces the movable member and the fixed member so as to rotatably connect the movable member; and a holding member that holds a rotating position of the movable member that is rotated at a predetermined angle through the rotating shaft, the fixed member comprises: a pair of connecting plates that extend upward from a first base and a second base arranged in substantially parallel with a base set surface, which are sufficiently wide to sustain a weight of the liquid crystal panel, having oblong first through holes through which the rotating shafts pierce; and a pair of rotating shaft support plates that extend from the first base and the second base facing the pair of connecting plates substantially in parallel at predetermined intervals, and having second through holes at positions corresponding to the first through holes of the pair of connecting plates, the holding member with a thin circular shape applying an urging force in a thickness direction comprises an oblong third through hole through which the rotating shafts pierce at the center, and a first protrusion that protrudes in the thickness direction from a position adjacent to a circumferential edge portion and a second protrusion that protrudes from a position on a circumference of a circle having the third through hole as the center moved at 90° from the first protrusion, the movable member comprises: a panel fixing surface threaded to a back surface of the liquid crystal panel and substantially parallel therewith and side plates extending forward from both end portions of the panel fixing surface in the thickness direction to form a rib structure having the panel fixing surface as a bottom surface; fourth set of through holes each having a circular cross section through which the rotating shafts pierce formed in the side plates, first set of holding holes into which the protrusions are inserted, each formed vertically above the fourth through hole on the circumference of the circle having a radius equivalent to a length from the center of the third through hole to the center of the protrusion, having the fourth through hole as a substantial center, second set of holding holes into which the protrusions are inserted, each tilted at approximately 10° forward in the thickness direction from the first holding hole on the circumference of the circle, and third set of holding holes into which the protrusions are inserted, each tilted at approximately 10° backward in the thickness direction from the first holding hole on the circumference of the circle; the rotating shaft comprises a first rotating shaft and a second rotating shaft each having a substantially same configuration provided with: a first portion with a cross section of a shaft extending from a substantial center of a thin head portion having the substantially circular cross section has a flat configuration such that the cross section of a portion equivalent to a thickness of the holding member from a head portion is engaged with the second through hole; a second portion with a cross section of a portion equivalent to the thickness of the movable member from an end of the first portion has a substantially circular configuration; a third portion with a cross section of a portion equivalent to the thickness of the fixed member from an end of the second portion has a flat configuration so as to be engaged with the first through hole of the fixed member; and a fourth portion having an external thread from an end of the third portion to a tip end, the side plates of the movable member are interposed between the holding member and the connecting plates of the fixed member such that the protrusions are inserted into the holding holes formed in the side plates; pipe-like support members each having a thread hole hinged with the fourth portions of the first and the second rotating shafts between the pair of connecting plates and the pair of the rotating shaft support plates of the fixed member are disposed; each portion below the thin head portion of the first and the second rotating shafts presses a peripheral edge of the second through hole of the holding member such that the first and the second rotating shafts pierces from outside through the respective through holes to press contact a surface having the protrusions and the side plates of the movable member, the first and the second rotating shafts that have pierced, are fixed using the support members, and then the support members are threaded with fasteners from the pair of rotating shaft support plates to block a rotation of the support member.

In the aforementioned structure, the movable member which fixes the liquid crystal panel is supported at the fixed member to be connected through the rotating shaft. The rotating position of the movable member which has been rotated at the predetermined angle via the rotating shaft is fixed by inserting the protrusion of the holding member into the holding hole formed in the side plate of the movable member such that the tilt angle of the liquid crystal panel is selectable.

As the protrusion is inserted into each of the holding holes formed in the side plates, the side plate of the movable member is interposed between the holding member and the connecting plate of the fixed member. The first and the second rotating shafts are inserted from the holding members to pierce therethrough via the through hole. The rotating shafts which have pierced are threaded with the internal thread. Further, the pair of the rotating shaft support plates and the support members are fixed by threading with the second through holes. Each surface below the head portion of the umbrella-like portion of the first and the second rotating shafts presses the corresponding peripheral edge of the second through holes of the holding member such that the surface of the holding member having the protrusion and the edge surface of the movable member are brought into press contact to apply the force in the direction where the protrusion inserted into the holding hole protrudes, thus holding the rotating position of the movable member. The holding member urges in the thickness direction with the elastic force. When the movable member is rotated along the rotating shaft, the protrusion is disengaged from the holding hole, and further inserted into the other holding hole with the rotation of the movable member.

According to the present invention, a tilt device, comprising: a movable member that fixes a liquid crystal panel; a fixed member that supports the movable member; a rotating shaft that pierces the movable member and the fixed member so as to rotatably connect the movable member; and a holding member that holds a rotating position of the movable member that is rotated at a predetermined angle through the rotating shaft, the fixed member comprising a fixed portion that blocks a rotation of the fixed member around an axial center of the rotating shaft that has pierced the movable member and the fixed member; and the holding member comprising a protrusion protruding from one side surface is formed into a thin configuration to apply an urging force in a direction where the protrusion protrudes, and fixed to the fixed member to apply a pressing force in the direction where the protrusion protrudes with a force substantially in parallel with the rotating shaft; and the movable member comprises a plurality of holding holes that allow the protrusion of the fixed holding member to be inserted therethrough and engaged therewith when the movable member is rotated along the rotating shaft.

In the aforementioned structure, the movable member and the fixed member are rotatably connected via the rotating shaft. The rotating shaft which pierces the fixed member is fixed to block the rotation at the fixed portion. The holding member is fixed to the fixed member to apply the pressure substantially in parallel with the rotating shaft in the direction where the protrusion protrudes. When the movable member is rotated along the rotating shaft, a plurality of holding holes through which the protrusion is inserted to be engaged with the protrusion to hold the rotating position. As the holding member exhibits the elastic force in the thickness direction, the protrusion is disengaged from the holding hole by rotating the movable member along the rotating direction of the rotating shaft. This makes it possible to combine the lock mechanism and the torque generation mechanism of the tilt device into a single component. This makes it possible to provide the tilt device which improves the assembly efficiency by reducing the number of components.

In the tilt device according to the present invention, the fixed portion is configured to have a cross section of a portion around a tip cut such that the through hole of the fixed member through which the rotating shaft pierces has a flat cross section, and the cross section of the portion where the rotating shaft pierces at least the through hole is engaged with the flat cross section.

In the aforementioned structure, the fixed portion is formed such that the through hole of the fixed portion through which the rotating shaft pierces has a flat cross section, and the rotating shaft has its portion around the tip is cut to allow the cross section of the portion that pierces the fixed member is engaged with the flat portion of the through hole. The cross section shape of the rotating shaft is formed to limit the rotation of the fixed member, thus simplifying the structure.

In the tilt device according to the present invention, the holding member includes a through hole through which the rotating shaft pierces, and the rotating shaft pierces the holding member, the fixed member and the movable member such that the movable member is interposed between the holding member and the fixed member.

In the aforementioned structure, the rotating shaft pierces the holding member, the fixed member and the movable member such that the movable member is interposed between the holding member and the fixed member. That is, the same rotating shaft pierces those fixed member, movable member and the holding member to realize the simply structured lock mechanism.

In the tilt device according to the present invention, the rotating shaft includes a first rotating shaft having a shaft portion which extends from a substantial center of a thin head portion having a circular cross section, and a second rotating shaft having the same configuration as the first rotating shaft, and the first and the second rotating shafts interpose the fixed member and the movable member so as to pierce from both outer end surfaces.

In the aforementioned structure, the rotating shaft includes the first and the second rotating shafts, and pierces the fixed members and the movable members from both outer sides. In the case where the width defined by the fixed member and the movable member is large, the length of the rotating shaft may be made short, thus saving the material.

In the tilt device according to the present invention, the holding member includes a first protrusion and a second protrusion arranged in accordance with a positional relationship on a circumference of a circle with the through hole as the center at the interval of 90°. The holding hole of the movable member which receives the first protrusion when the movable member is rotated along the rotating shaft includes a first holding hole formed such that a display of a liquid crystal panel fixed to the movable member becomes substantially vertical to a base set surface of the fixed member, a second holding hole formed such that the display of the liquid crystal panel is tilted forward from the vertical position at 10°, and a third holding hole formed such that the display of the liquid crystal panel is tilted backward from the vertical position at 10°. The second protrusion is inserted one of the first holding hole, the second holding hole and the third holding hole such that the display of the liquid crystal panel fixed to the movable member becomes substantially horizontal to the base set surface of the fixed member.

In the aforementioned structure, the protrusion of the holding member is inserted into one of the first, second, and third holding holes so as to be engaged. This allows the liquid crystal panel fixed to the movable member to take positions of three patterns. The second protrusion is inserted into one of the respective holding holes such that the display of the liquid crystal panel takes the rotating position substantially vertical to the fixed member. This allows the liquid crystal panel to be packaged in the compact manner, thus reducing the packaging material. It is to be understood that the aforementioned structure according to the first aspect of the present invention provides the same functions as those of the second to the fourth aspects of the present invention.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

A liquid crystal panel stand which employs the tilt device according to the present invention will be described in detail. The tilt device of the invention is not limited to be used for the liquid crystal panel stand as described above, but may be applied to an arbitrary structure so long as the tilt device according to the present invention is employed. The embodiment of the invention will be described in the following order.

Figure 1:
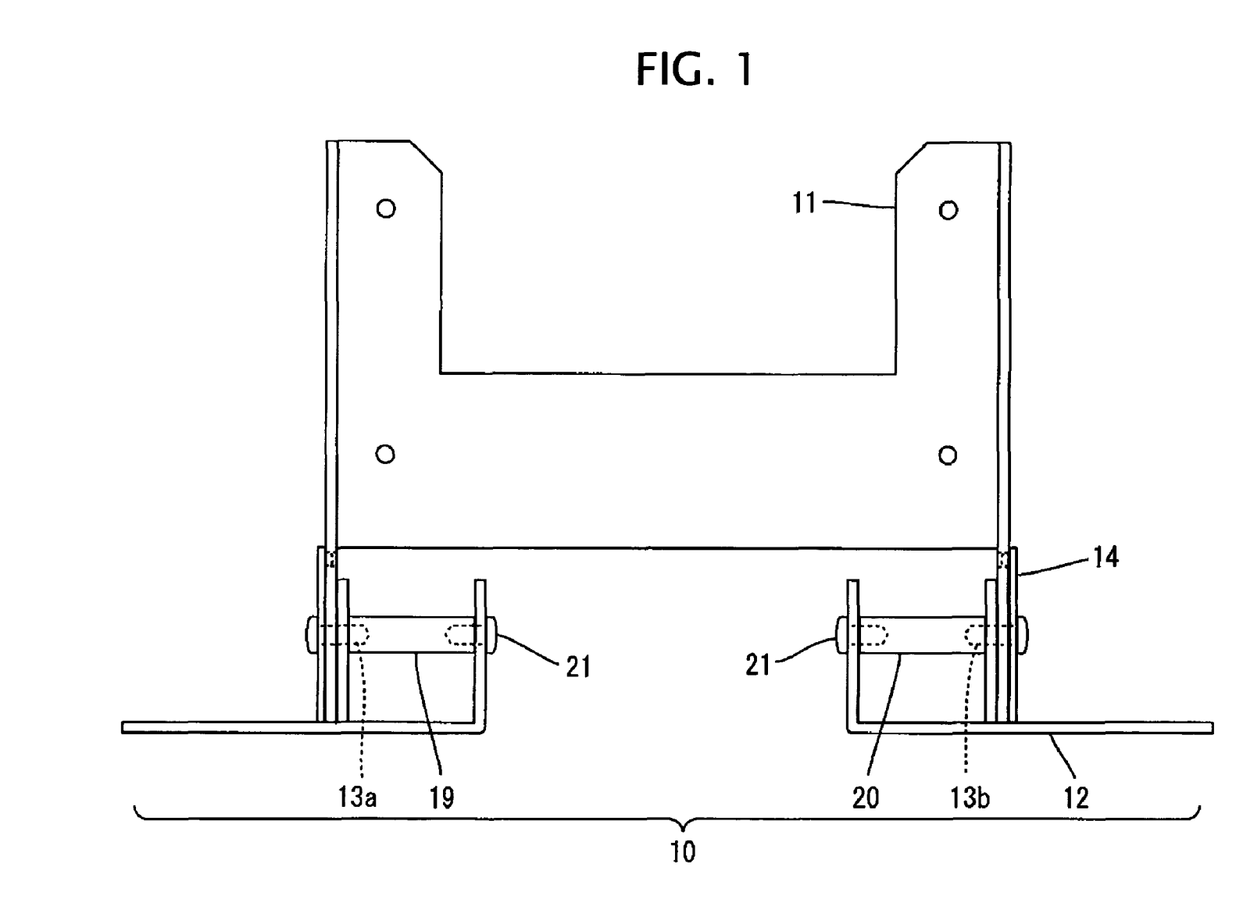
FIG. 1 is a view showing an entire structure of a liquid crystal panel stand.

(1) Structure of the liquid crystal stand (2) Modified example (3) Effect of the invention (1) STRUCTURE OF LIQUID CRYSTAL STAND FIG. 1 shows a front view and the side view of the liquid crystal stand. Referring to the drawing, a liquid crystal panel stand 10 is formed of a movable member 11, a fixed member 12, a rotating shaft 13, and a holding member 14. The liquid crystal panel stand 10 is capable of tilting the liquid crystal panel fixed to the movable member 11 at a predetermined angle.

Figure 2:
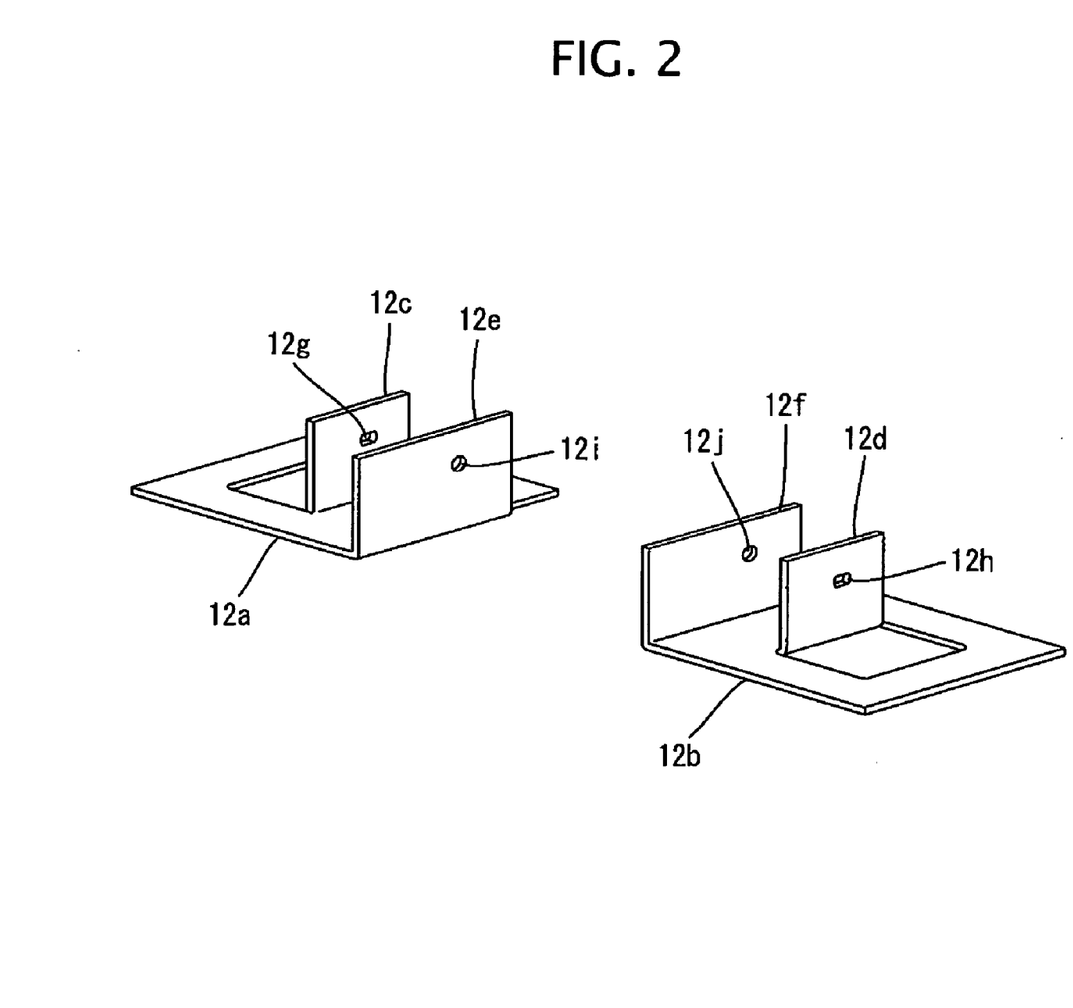
FIG. 2 is a perspective view of the fixed member.

FIG. 2 is a perspective view of the fixed member. Referring to the drawing, the fixed member 12 includes a first base 12a, a second base 12b, connecting plates 12c, 12d, and rotating shaft support plates 12e, 12f. Each of the bases, that is, the first and the second bases 12a and 12b is arranged substantially in parallel with the base set surface of the liquid crystal panel stand 10, and wide sufficient to bear the weight of the liquid crystal panel. The pair of connecting plates 12c and 12d vertically extend upward from the first base 12a and the second base 12b, respectively. The connecting plates 12c and 12d have oblong first through holes 12g, 12h through which the rotating shaft 12 pierces. The first through holes 12g and 12h are engaged with the rotating shafts 13a and 13b to be described later so as to prevent the respective rotations of the rotating shafts 13a and 13b which have pierced the fixed member 12 as the fixed portion. The rotating shaft support plates 12e and 12f extend upward from the first base 12a and the second base 12b, respectively in substantially parallel with the connecting plates 12c and 12d so as to be disposed opposite thereto at predetermined intervals, respectively. The rotating shaft support plates 12e and 12f have second through holes 12i and 12j through which the screw pieces at positions corresponding to those of the first through holes 12g and 12h of the opposite connecting plates 12c and 12d, respectively.

Figure 3:
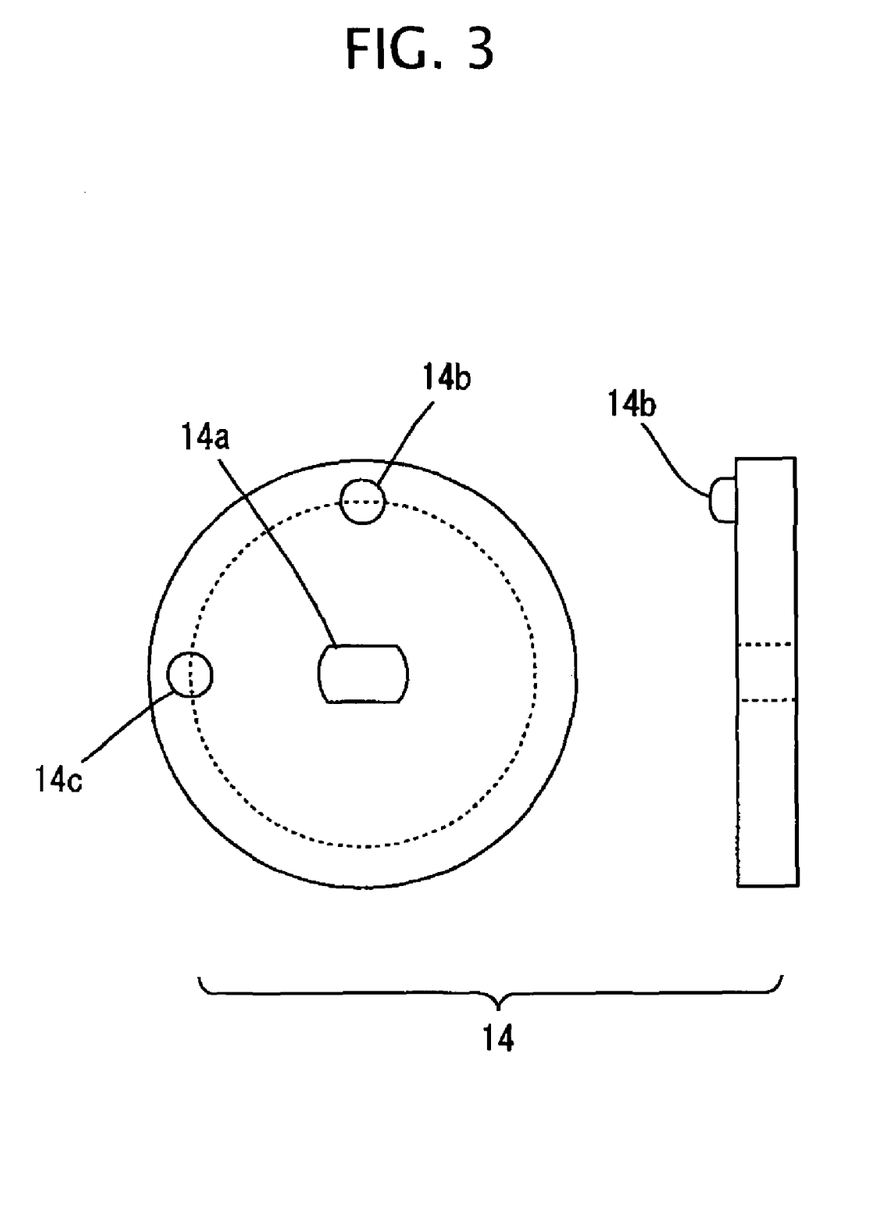
FIG. 3 shows a front view and a side view of the holding member.

FIG. 3 shows the front view and the side view of the holding member. Referring to the drawing, the holding member 14 has a circular shape with a flat third through hole 14a formed substantially in the center thereof, through which the rotating shaft 13 pierces. The holding member has a first protrusion 14b and a second protrusion 14c each protruding upward from one side surface of the circular shape by a few millimeters. The third through hole 14a has an oblong shape with its diameter in the axial direction is longer likewise the first through holes 12g, 12h. The holding member 14 has a thin thickness such that the protrusions 14b and 14c apply the urging force in the direction where the protrusions 14b and 14c protrude. The second protrusion 14c on the same circumference as the first protrusion 14b protrudes from the position at 90° moved from the first protrusion 14b with respect to the third through hole 14a as the substantial center. It is preferable to use the material that exhibits the elastic force such as the spring steel for forming the holding member 14 so as to apply the urging force in the direction where the protrusions 14b and 14c protrude. As the holding member 14 fixes the flat panel such as the liquid crystal panel to the movable member such that the rotating position is held, preferably, the protrusions 14b and 14c are formed of the material with sufficient reflective stress to the weight of the flat panel to be fixed. The protrusion may be integrally formed through the press forming process. Alternatively, the protrusion 14b may be formed as the other part so as to be fixed to the holding member 14.

Figure 4:
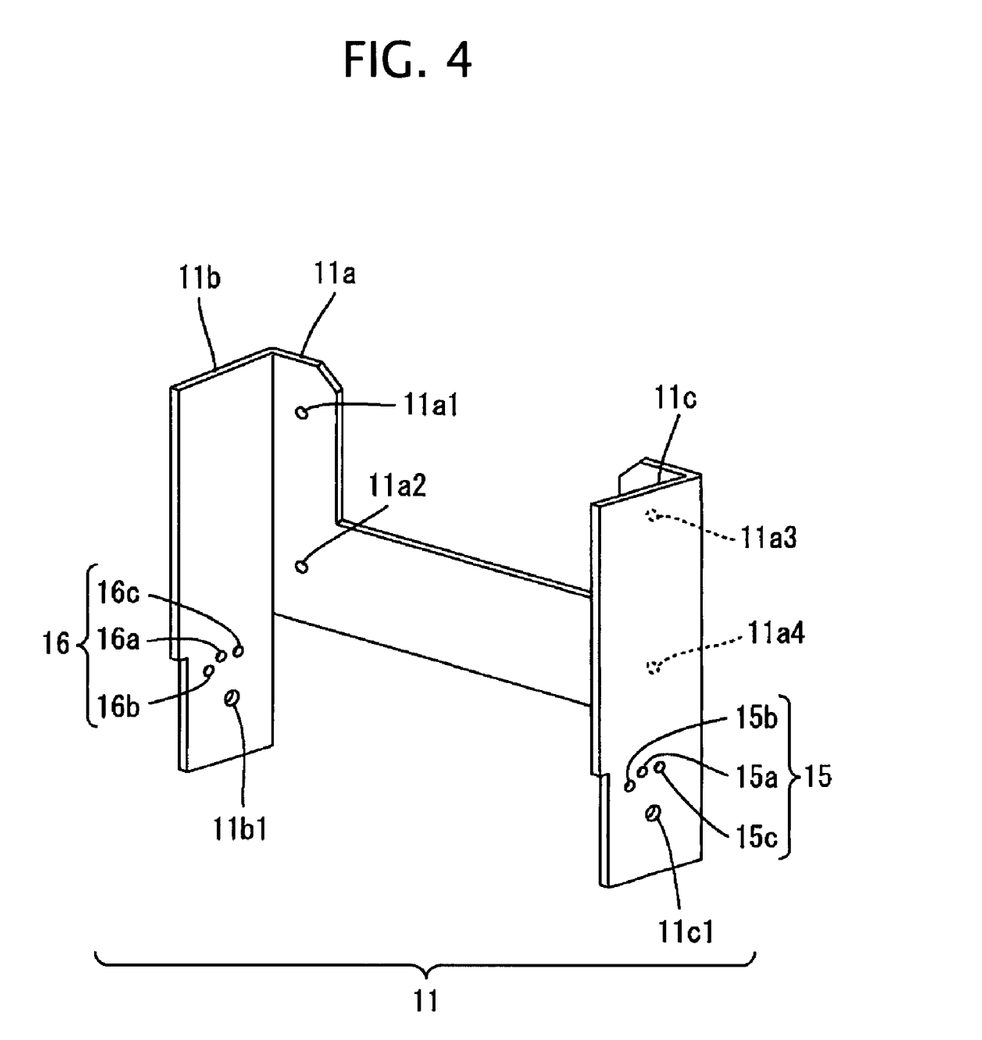
FIG. 4 is a perspective view of the movable member.

The movable member 11 is formed of a panel fixing surface 11a, and side plates 11b, 11c. The panel fixing surface 11a has thread holes 11a1, 11a2, 11a3 and 11a4 through which screws pierces to be in contact with the back surface of the liquid crystal panel in parallel therewith. The side plates 11b and 11c extend forward from both ends of the panel fixing surface 11a in the width direction to form the rib structure together with the panel fixing surface 11a as the bottom surface. The side plates 11b and 11c have fourth through holes 11b1 and 11c1 each having the circular cross section through which the rotating shaft 13 pierces, and holding holes 15 and 16 on the circumference of the circle having its radius equivalent to the length from substantially the center of the third through hole 14a to substantially the center of the protrusion, having each of the fourth through holes 11b1 and 11c1 as being substantially the center of the circle.

When the holding member 14 and the fixed member are fixed, the protrusion 14b of the holding member 14 is inserted into the holding holes 15 and 16, respectively so as to hold the rotating position of the movable member 11. The holding holes 15 and 16 for receiving the protrusions include first holding holes 15a, 16a which are formed above the fourth through holes 11b1 and 11c1, second holding holes 15b and 16b formed at the tilted positions from the first holding holes 15a and 16a at approximately 10° forward in the thickness direction, and third holding holes 15c and 16c formed at the tilted positions from the first holding holes 15a and 16a at approximately 10° backward in the thickness direction.

Figure 5:
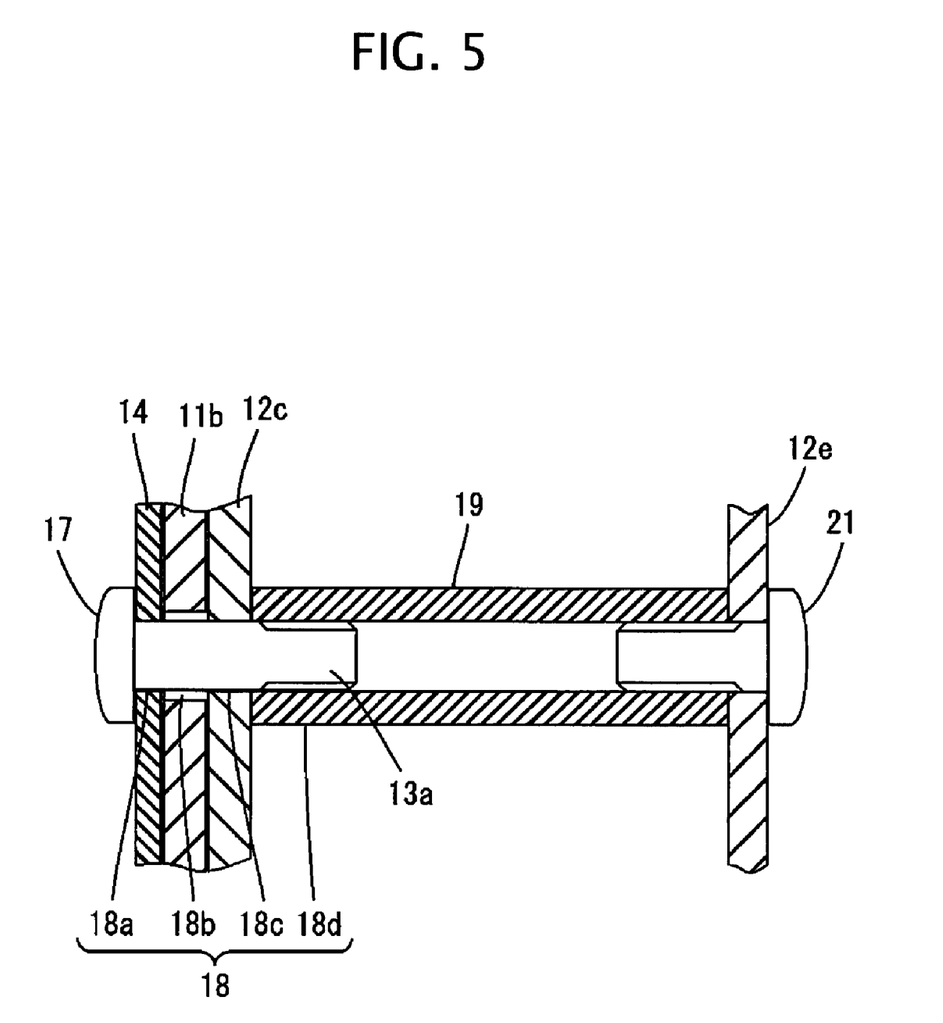
FIG. 5 is an enlarged view of the first rotating shaft.

The rotating shaft 13 includes a first rotating shaft 13a and a second rotating shaft 13b. As the configuration of the first rotating shaft 13a is the same as that of the second rotating shaft 13b, the first rotating shaft 13a will only be explained hereinafter while omitting the explanation of the second rotating shaft 13b. The first rotating shaft 13a is formed of a head portion 17 and a shaft portion 18. The head portion 17 is thin and has a circular cross section, and extends to the shaft portion 18 from substantially the center of the head portion 17. After the first rotating shaft 13a is inserted through the corresponding through hole, the head portion serves to retain the shaft portion 18.

The shaft portion 18 includes a first portion 18a, a second portion 18b, a third portion 18c and a fourth portion 18d each having the different cross section. The first portion 18a extends by an amount corresponding to the thickness of the holding member 14 in the direction where the shaft portion extends from the head portion 17, which is formed into the flat shape by cutting the portion around the tip. The second portion 18b extends by an amount corresponding to the thickness of the movable member 11 from the first portion 18a so as to have substantially the circular cross section. The third portion 18c extends by an amount corresponding to the thickness of the fixed member 12 from the second portion 18b in the axial direction so as to have a flat cross section obtained by cutting the portion around the tip. The fourth portion 18d has an external thread from the end of the third portion 18c to the tip end. The first rotating shaft 13a and the second rotating shaft 13b may be formed by trimming a single bar-like member, respectively. Alternatively, they may be formed through the rolling process, for example, forging.

The process for assembling the aforementioned fixed member 12, the movable member 11, the holding member 14 and the rotating shaft 13 into the liquid crystal panel stand 10 will be described hereinafter. The connecting plates 12c, 12d of the fixed member 12, the side plates 11b, 11c of the movable member 11, and the holding members 14 are arranged such that the connecting plates 12c, 12d are positioned inside and the holding member 14 are positioned outside so as to interpose the side plates 11b, 11c and to allow the protrusions 14b of the holding members 14 to be inserted into the holding holes 15, 16 of the movable members 11, respectively. Then the first and the second rotating shafts 13a, 13b are inserted from the holding member 14 into the third through holes 14a, the fourth through holes 11b1, 11c1, and the first through holes 12g, 12h, respectively in the aforementioned order. The first and the second rotating shafts 13a, 13b have pierced in the aforementioned process are fixed with pipe-like support members 19 and 20, respectively. Each inner wall surface of the pipe hole of the support members 19, 20 has an internal thread hinged with the fourth portion 18d of the first and the second rotating shafts 13a and 13b. This makes it possible to hinge the first and the second rotating shafts 13a and 13b with the support members 19 and 20 at the fourth portion 18d.

FIG. 5 is an enlarged view of the portion where the rotating shafts pierce. Referring to the drawing, the flat cross section of the first portions 18a of the first and the second rotating shafts 13a and 13b are engaged with the flat holes as the third through holes 14a of the holding members 14. Likewise, the flat cross section of the third portion 18c of the first and the second rotating shafts 13a and 13b are engaged with the flat holes as the first through holes 12h, 12g of the fixed member 12. As the fourth through holes 11b1, 11c1 of the movable member 11 and the second portion 18b of the first and the second rotating shafts 13a and 13b have circular cross sections, the first and the second rotating shafts 13a and 13b are fixed by the fixed member 12 and the holding member 14. However, the movable member 11 is held so as to be rotatable.

The support members 19, 20 are fixed from the rotating shaft support plates 12e, 12f such that the support members 19, 20 to which the first and the second rotating shafts 13a and 13b are fixed are not rotated. The support members 19, 20 may be fixed to the rotating shaft support plates 12e, 12f by fixing the support members 19, 20 with threads through the second through holes 12i, 12j of the rotating shaft support plates 12e, 12f. Alternatively, the tapered pin below the head portion is inserted into the second through holes, and the support members 19, 20 are caulked thereafter. With the aforementioned fixing process, rotations of the support members 19, 20 are blocked, and each portion of the first and the second rotating shafts 13a, 13b below the head portion 17 serves to press the peripheral edge of the third through hole 14a of the holding member so as to bring the surface having the protrusion 14b of the holding member 14 in press contact with the edge surfaces 11b, 11c of the movable member 11. As a result, the pressing force is generated in the direction where the protrusion 14b which has been inserted into the corresponding holding hole protrudes. The holding member, thus, is allowed to perform the lock function.

In the case where the movable member 11 is rotated in parallel with the side plates 11b, 11c around the rotating shaft 13 as the center, the protrusions 14b pushed by the bottom surfaces of the holding holes 15, 16 with the rotation of the side plates 11b, 11c are disengaged from the holding holes 15, 16 such that the fixation of the movable member 11 and the holding member 14 is released. In the case where the movable member 11 is kept rotating, the protrusions 14b are inserted into the next holding holes 15, 16 such that the movable member 11 and the fixed member 12 are fixed by the protrusions 14b.

At this time, the movable member 11 has the holding holes 15 and 16, that is, the first holding holes 15a, 16a, the second holding holes 15b, 16b, and the third holding holes 15c, 16c arranged on the circumference of the circle having the radius substantially the same as the length from the axial center of the third through hole 14a of the holding member 14 to the axial center of the protrusion 14b with the fourth through holes 11b1, 11c1 as the substantial centers. As the side plates 11b, 11c of the movable member 11 rotate, the protrusions 14b, 14c are inserted into the corresponding holding holes formed on the aforementioned circumference of the circle of the side plates 11b, 11c such that the rotating position of the panel fixing surface 11a of the movable member is changed.

Figure 6:
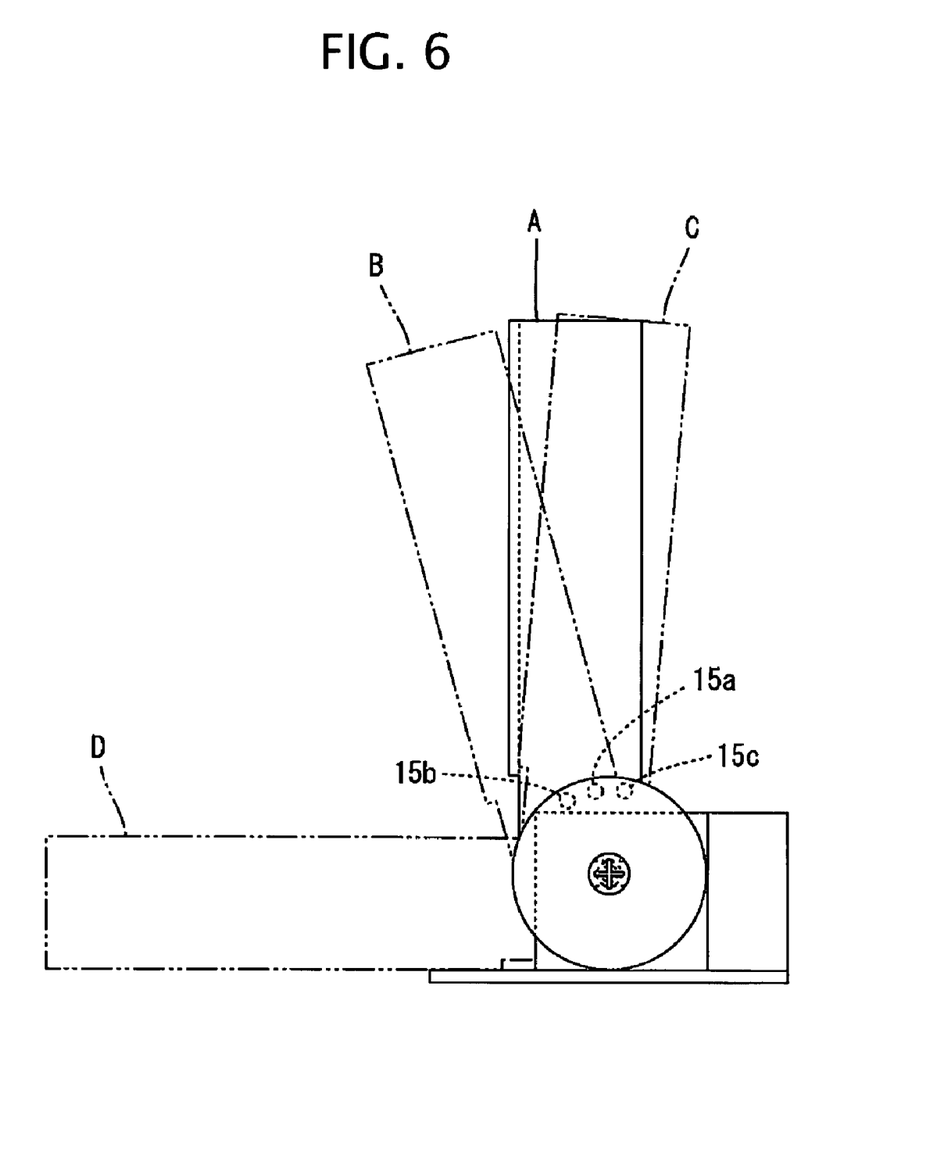
FIG. 6 is a view showing the rotating position of the liquid crystal panel stand.

FIG. 6 is a view showing the rotating position of the liquid crystal panel stand. Referring to the drawing, in the case where the movable member 11 is rotated to insert the first protrusions 14b into the first holding holes 15a, 16a, the panel fixing surface 11a to which the liquid crystal panel is fixed takes the position A at substantially vertical to the base set surface. In the case where the first protrusions 14b are inserted into the second holding holes 15b, 16b and the third holding holes 15c, 16c, the liquid crystal panel is tilted forward and backward at approximately 10° with respect to the position where the first protrusion 14b is inserted into the first holding holes 15a, 16a as shown by the positions B and C, respectively. In the case where the movable member 11 is further rotated substantially in parallel with the base set surface such that the second protrusion 14c is inserted into the first holding holes 15a, 16a, the liquid crystal panel is brought into the position D in the drawing substantially horizontal to the base set surface. Such position makes it possible to make the liquid crystal panel stand compact when it is packaged in the cardboard box to be shipped, thus reducing the packaging material such as the cardboard box.

(2) MODIFIED EXAMPLE

The aforementioned liquid crystal panel stand 10 may be arbitrarily structured so long as the movable member 11 and the fixed member 12 are rotatably connected with the rotating shaft 13, and the rotating position of the movable member 11 is held by the holding member 14 with the first protrusion 14b. In the modified example of the embodiment shown in FIG. 7, the holding member 14 is directly fixed to the fixed member 12 with a thread 21 for the fixing purpose rather than having the rotating shaft 13 pierced therethrough. The holding member 14 is threaded to the fixed member with the force substantially in parallel with the rotating shaft 13 so as to apply the pressing force in the direction where the first protrusion 14b protrudes. The holding holes 15, 16 may be formed in the movable member 11 on the trace of the first protrusion 14b resulting from the rotation of the movable member 11 along the rotating shaft 13.

Figure 7:
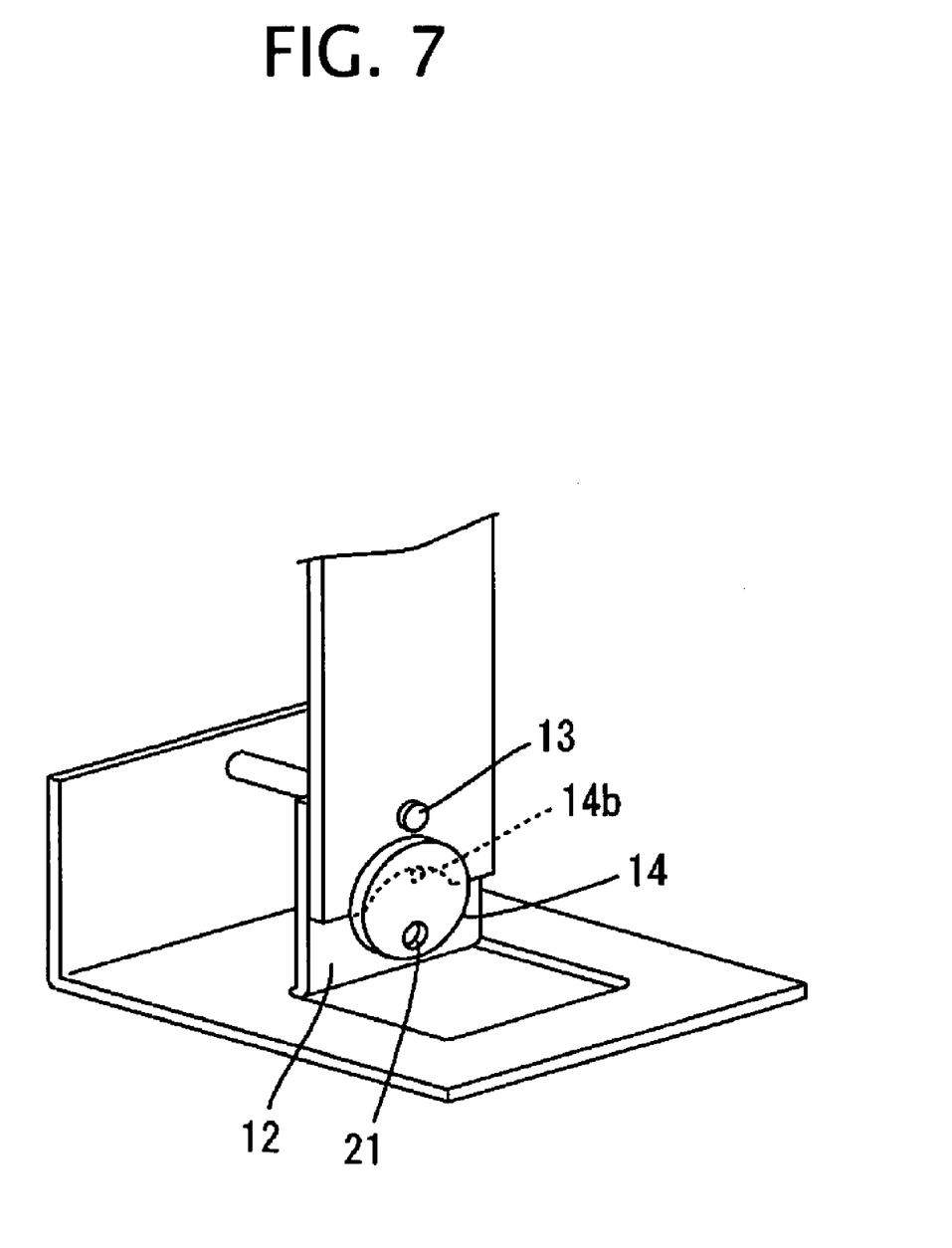
FIG. 7 is a view showing a modified example of the liquid crystal panel stand.

In the aforementioned structure, the first protrusion 14b of the holding member 14 is rotated around the rotating shaft 13 so as to be inserted into the corresponding one of the holding holes of the movable member 11. This makes it possible to change the rotating position of the movable member 11. The modified example provides the same function as that of the tilt device having the same structure as the one described above.

(3) CONCLUSION

The rotating shaft 13 pierces the fixed member 12 which has a fixing member that blocks the rotation of the fixed member around the axial center of the rotating shaft 13. The holding member 14 includes protrusions 14b, 14c each protruding from one side surface, and is formed as a thin configuration to apply the urging force in the direction where the protrusions 14b, 14c protrude. The holding member 14 is fixed to the fixed member 12 to apply the pressing force in the direction where the protrusions 14b, 14c protrude with the force substantially in parallel with the rotating shaft 13. The movable member 11 includes a plurality of holding holes 15, 16 through which the protrusions 14b, 14c of the holding member 14 fixed to the fixed member 12 are inserted and engaged when the movable member 11 is rotated along the rotating shaft 13. The use of the torque generating mechanism, for example, the plate spring is not required. The lock mechanism and the torque generating mechanism may be combined into the single component for the tilt device without using the torque generating mechanism, for example, the plate spring. This makes it possible to improve the assembly efficiency.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

What is claimed is:

1. A liquid crystal panel stand, comprising:
   a movable member that fixes a liquid crystal panel;
   a fixed member that supports the movable member;
   a rotating shaft that pierces the movable member and the fixed member so as to rotatably connect the movable member; and
   a holding member that holds a rotating position of the movable member that is rotated at a predetermined angle through the rotating shaft,
   the fixed member comprises:
   a pair of connecting plates that extend upward from a first base and a second base arranged in substantially parallel with a base set surface, which are sufficiently wide to sustain a weight of the liquid crystal panel, having oblong first through holes through which the rotating shafts pierce; and
   a pair of rotating shaft support plates that extend from the first base and the second base facing the pair of connecting plates substantially in parallel at predetermined intervals, and having second through holes at positions corresponding to the first through holes of the pair of connecting plates, the holding member with a thin circular shape applying an urging force in a thickness direction comprises an oblong third through hole through which the rotating shafts pierce at the center, and a first protrusion that protrudes in the thickness direction from a position adjacent to a circumferential edge portion and a second protrusion that protrudes from a position on a circumference of a circle having the third through hole as the center moved at 90° from the first protrusion, the movable member comprises:

a panel fixing surface threaded to a back surface of the liquid crystal panel and substantially parallel therewith and side plates extending forward from both end portions of the panel fixing surface in the thickness direction to form a rib structure having the panel fixing surface as a bottom surface;

fourth set of through holes each having a circular cross section through which the rotating shafts pierce formed in the side plates, first set of holding holes into which the protrusions are inserted, each formed vertically above the fourth through hole on the circumference of the circle having a radius equivalent to a length from the center of the third through hole to the center of the protrusion, having the fourth through hole as a substantial center, second set of holding holes into which the protrusions are inserted, each tilted at approximately 10° forward in the thickness direction from the first holding hole on the circumference of the circle, and third set of holding holes into which the protrusions are inserted, each tilted at approximately 10° backward in the thickness direction from the first holding hole on the circumference of the circle;

the rotating shaft comprises a first rotating shaft and a second rotating shaft each having a substantially same configuration provided with:

a first portion with a cross section of a shaft extending from a substantial center of a thin head portion having the substantially circular cross section has a flat configuration such that the cross section of a portion equivalent to a thickness of the holding member from a head portion is engaged with the second through hole;

a second portion with a cross section of a portion equivalent to the thickness of the movable member from an end of the first portion has a substantially circular configuration;

a third portion with a cross section of a portion equivalent to the thickness of the fixed member from an end of the second portion has a flat configuration so as to be engaged with the first through hole of the fixed member; and a fourth portion having an external thread from an end of the third portion to a tip end, the side plates of the movable member are interposed between the holding member and the connecting plates of the fixed member such that the protrusions are inserted into the holding holes formed in the side plates;

pipe-like support members each having a thread hole hinged with the fourth portions of the first and the second rotating shafts between the pair of connecting plates and the pair of the rotating shaft support plates of the fixed member are disposed;

each portion below the thin head portion of the first and the second rotating shafts presses a peripheral edge of the second through hole of the holding member such that the first and the second rotating shafts pierces from outside through the respective through holes to press contact a surface having the protrusions and the side plates of the movable member, the first and the second rotating shafts that have pierced, are fixed using the support members, and then the support members are threaded with fasteners from the pair of rotating shaft support plates to block a rotation of the support member.

* * * * *